(12) United States Patent
Bierwith et al.

(10) Patent No.: US 9,187,881 B2
(45) Date of Patent: Nov. 17, 2015

(54) RELIABLE CONNECTION SYSTEM AND ASSEMBLIES AND METHODS FOR USING THE RELIABLE CONNECTIONS

(71) Applicant: Berkeley Forge & Tool, Inc., Berkeley, CA (US)

(72) Inventors: Paul Bierwith, San Ramon, CA (US); Robert Katsma, Turlock, CA (US)

(*) Notice: Subject to any disclaimer, the term of this patent is extended or adjusted under 35 U.S.C. 154(b) by 132 days.

(21) Appl. No.: 14/033,364

(22) Filed: Sep. 20, 2013

(65) Prior Publication Data
US 2015/0082671 A1    Mar. 26, 2015

(51) Int. Cl.
*E02F 9/28* (2006.01)
*B23P 19/04* (2006.01)
*F16B 39/34* (2006.01)

(52) U.S. Cl.
CPC .............. *E02F 9/2833* (2013.01); *B23P 19/04* (2013.01); *F16B 39/34* (2013.01)

(58) Field of Classification Search
CPC ...... B23P 19/04; E02F 9/2825; E02F 9/2841; E02F 9/2883; E02F 9/2833; F16B 1/005; F16B 39/34
USPC .............. 37/446, 452–457; 172/701.1–701.3, 172/753, 772.5; 403/31, 374.1, 374.4, 370, 403/373, 409.1
See application file for complete search history.

(56) References Cited

U.S. PATENT DOCUMENTS

| | | |
|---|---|---|
| 1,220,186 A | 3/1917 | Chambers |
| 3,012,346 A | 12/1961 | Larsen |
| 3,256,622 A | 6/1966 | Hostetter |
| 3,520,224 A | 7/1970 | Elbert et al. |
| 3,556,259 A | 1/1971 | Allen |
| 3,572,785 A | 3/1971 | Larson |
| 3,722,932 A | 3/1973 | Dougall |

(Continued)

FOREIGN PATENT DOCUMENTS

| | | |
|---|---|---|
| CA | 2 028 403 C | 8/2000 |
| CN | 86209610 U | 12/1987 |

(Continued)

OTHER PUBLICATIONS

International Search Report and Written Opinion mailed Oct. 16, 2014, from PCT Application No. PCT/US2014/038855 (13 pages).

(Continued)

*Primary Examiner* — Robert Pezzuto
(74) *Attorney, Agent, or Firm* — Kilpatrick Townsend & Stockton LLP

(57) ABSTRACT

A securing apparatus including a first and second component. The first component has an opening extending along an axis. The elongated member has a piston hole penetrating the first component and aligned with the opening. A piston is located within the piston hole, and is complimentary shaped to sit within the piston. A pressure member is located within the opening, and an activator is configured to coordinate with and extend into the opening. The activator applies a force to the pressure member and distorts the pressure member. The second component, which compliments and mates with the first component, has an engaging surface that coordinates with an end of the piston. The force applied to the pressure member causes the pressure member to distort and apply pressure to the piston to extend the piston outward to interact with the engaging surface of the second component to restrain the second component.

22 Claims, 14 Drawing Sheets

(56) References Cited

U.S. PATENT DOCUMENTS

| | | |
|---|---|---|
| 3,760,588 A | 9/1973 | Kustusch |
| 3,831,298 A | 8/1974 | Helton et al. |
| 3,891,065 A | 6/1975 | Iijima et al. |
| 4,267,653 A | 5/1981 | Hahn et al. |
| 4,390,758 A | 6/1983 | Hendrickson |
| 4,413,432 A | 11/1983 | Bierwith |
| 4,663,867 A | 5/1987 | Hahn et al. |
| 4,823,487 A | 4/1989 | Robinson |
| 4,995,587 A | 2/1991 | Alexius |
| 5,081,881 A | 1/1992 | Ide |
| 5,134,793 A | 8/1992 | Bierwith |
| 5,311,681 A | 5/1994 | Ruvang et al. |
| 5,465,512 A | 11/1995 | Livesay et al. |
| 5,743,031 A | 4/1998 | Launder et al. |
| 5,806,215 A | 9/1998 | Matthews |
| 5,829,556 A | 11/1998 | Domange |
| 5,926,982 A | 7/1999 | Keech et al. |
| 5,967,623 A | 10/1999 | Agnew |
| 5,983,534 A | 11/1999 | Robinson et al. |
| 6,009,644 A | 1/2000 | Hedley |
| 6,032,390 A | 3/2000 | Bierwith |
| 6,151,812 A | 11/2000 | Bierwith |
| 6,209,238 B1 | 4/2001 | Ruvang |
| 6,216,368 B1 | 4/2001 | Bierwith |
| 6,588,965 B1 | 7/2003 | Keech et al. |
| 6,668,472 B2 | 12/2003 | Bierwith |
| 6,695,294 B2 | 2/2004 | Miller et al. |
| 6,986,216 B2 | 1/2006 | Emrich et al. |
| 7,219,454 B2 | 5/2007 | Maher |
| 7,299,570 B2 | 11/2007 | Emrich et al. |
| 7,594,565 B1 | 9/2009 | Adams, Jr. |
| 7,730,652 B2 | 6/2010 | McClanahan et al. |
| 7,862,277 B2 | 1/2011 | Dingwall et al. |
| 7,997,017 B2 | 8/2011 | McClanahan et al. |
| 8,104,200 B2 | 1/2012 | Briscoe |
| 8,464,444 B2 | 6/2013 | Bierwith |
| 2004/0016153 A1 | 1/2004 | Pippins |
| 2004/0060209 A1 | 4/2004 | Watanabe |
| 2004/0060435 A1 | 4/2004 | Maher |
| 2007/0051022 A1 | 3/2007 | Meyers et al. |
| 2009/0205385 A1 | 8/2009 | Cozzolino |
| 2011/0061271 A1 | 3/2011 | Bierwith |
| 2011/0258891 A1 | 10/2011 | Ruvang |
| 2013/0153073 A1 | 6/2013 | Barth et al. |
| 2013/0318839 A1 | 12/2013 | Bierwith |

FOREIGN PATENT DOCUMENTS

| | | |
|---|---|---|
| CN | 1032830 A | 5/1989 |
| CN | 1104282 A | 6/1995 |
| CN | 1308701 A | 8/2001 |
| JP | S62-1941 A | 1/1987 |
| MX | PA04001316 A | 2/2005 |
| WO | 99/58773 A1 | 11/1999 |
| WO | 01/25551 A1 | 4/2001 |
| WO | 2004/099510 A2 | 11/2004 |
| WO | 2005/066422 A2 | 7/2005 |
| WO | 2007/078510 A2 | 7/2007 |
| WO | 2008/140878 A1 | 11/2008 |

OTHER PUBLICATIONS

US Office Action mailed Nov. 17, 2014, from U.S. Appl. No. 13/898,454 (8 pages).

Australian Office Action mailed on Feb. 16, 2012 for AU Patent Application No. 2010219431, 2 pages.

Canadian Office Action mailed on Apr. 19, 2012 for CA Patent Application No. 2,714,471, 4 pages.

Australian Notice of Acceptance mailed on Jun. 5, 2012 for AU Patent Application No. 2010219431, 3 pages.

Chilean Office Action received on Aug. 17, 2012 for CL Patent Application No. 0976-10, 8 pages.

First Office Action mailed Sep. 12, 2012, for Chinese Application No. 201010390790.3, 14 pages.

International Search Report and Written Opinion mailed Dec. 18, 2014, from PCT Application No. PCT/US2014/056631 (12 pages).

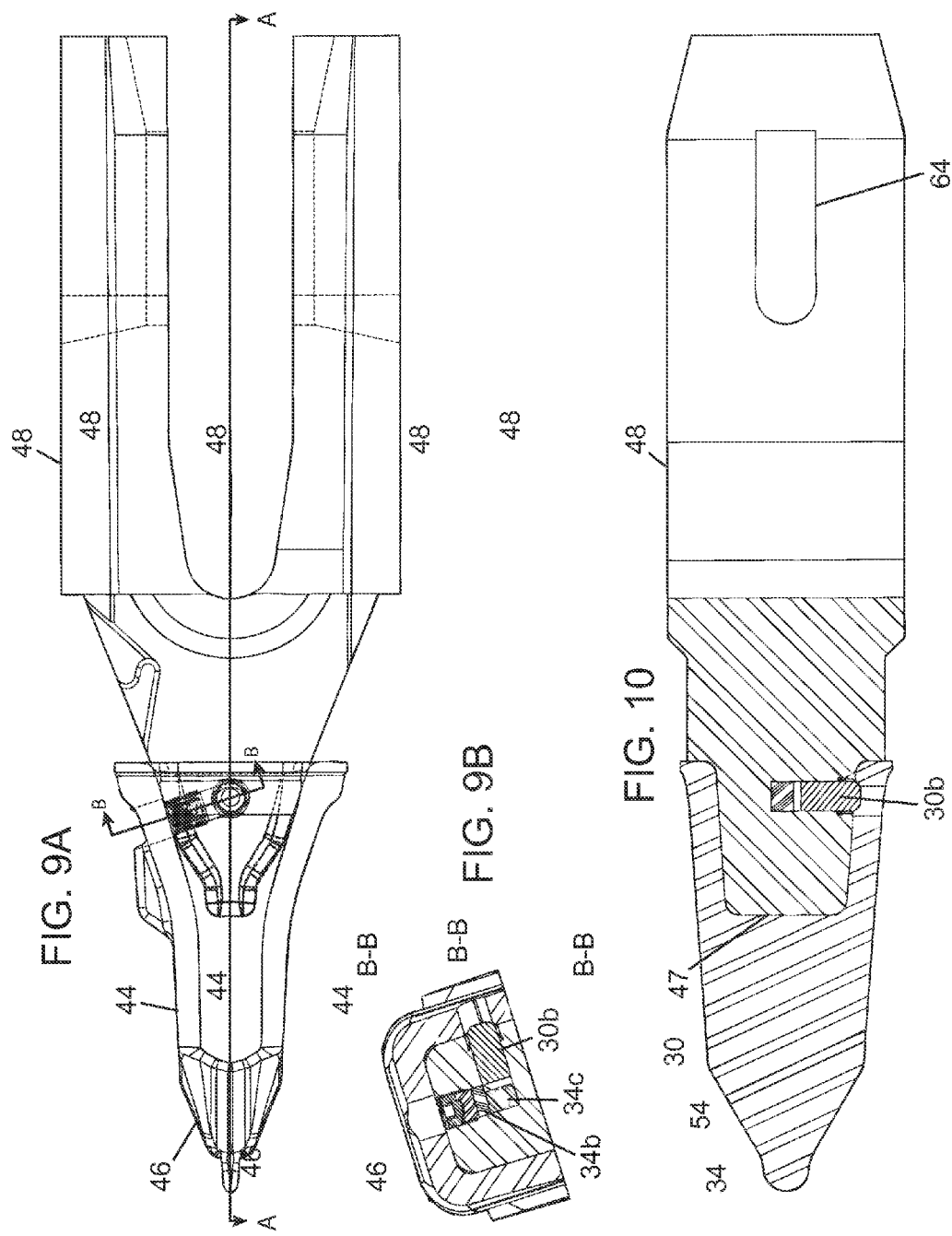

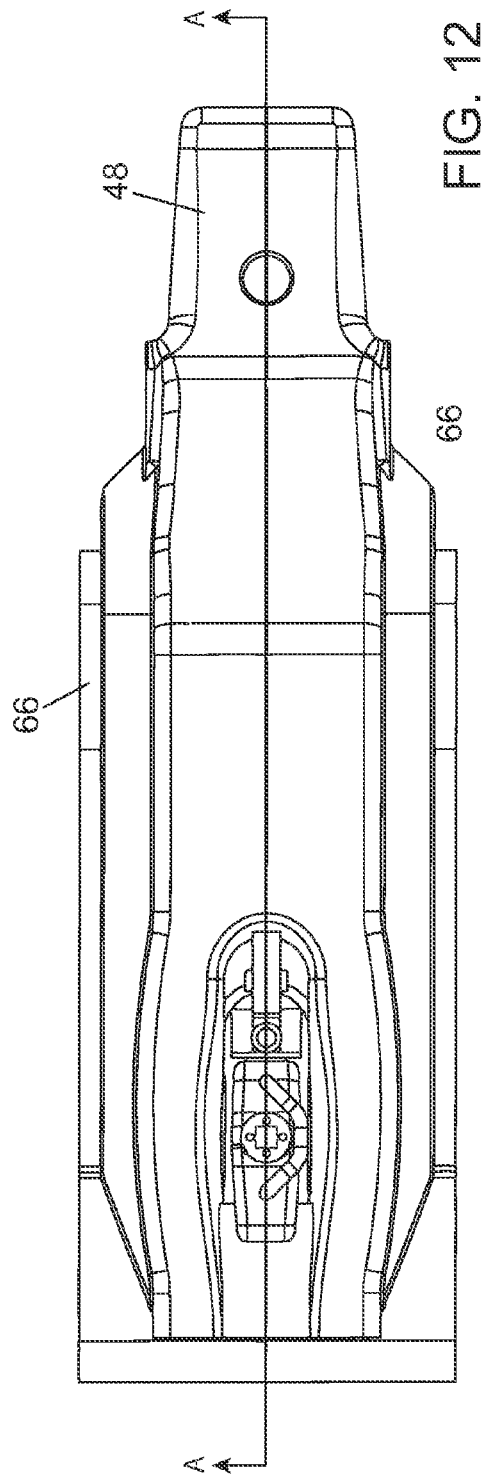
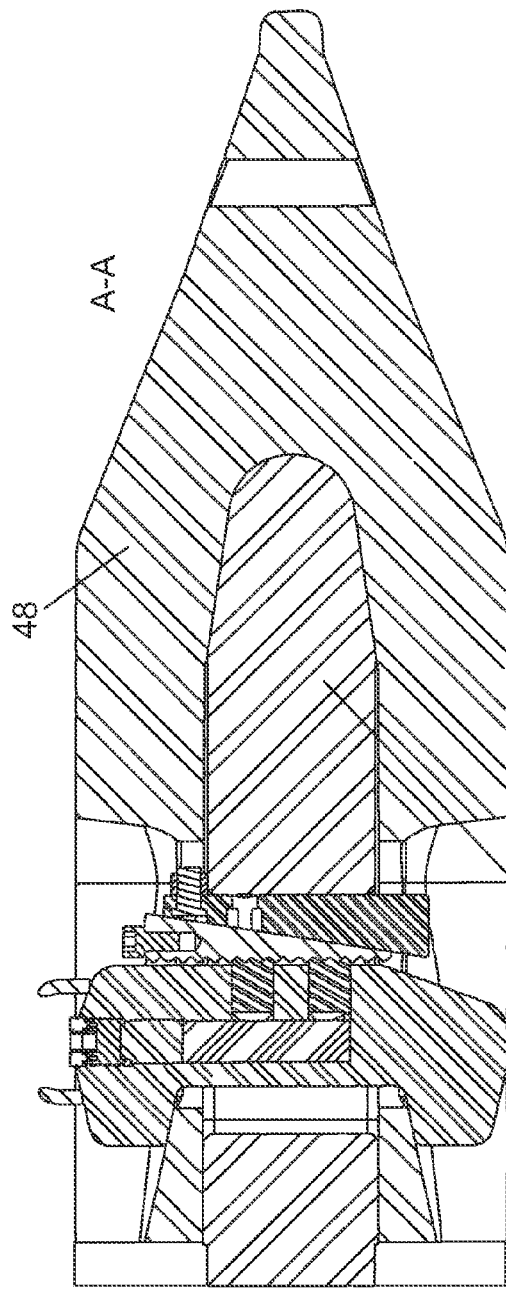
FIG. 12
FIG. 13

RELIABLE CONNECTION SYSTEM AND ASSEMBLIES AND METHODS FOR USING THE RELIABLE CONNECTIONS

BACKGROUND OF THE INVENTION

Ground-moving and excavating equipment employs shovels, buckets and similar equipment with which earth, gravel, rock formation and the like are excavated and moved around. For example buckets carry a lip along their digging edges, and the lips in turn mount digging teeth.

The digging teeth and their connections to the lips of the buckets are subject to the most wear and tear of the entire bucket because they are exposed to constant abrasion, impacts and the like. As a result, they require frequent replacement. Replacing the teeth in accordance with the prior art is relatively time-consuming, and the excavating equipment must sit idle during that time, which is undesirable because it ultimately reduces profits. Additionally, releasing connections of the prior art requires special tools and hammers which are undesirable for safety reasons as well as adding to the expense for maintenance of the earth moving equipment.

There are presently many variations of how the teeth are attached to the lips of the buckets or shovels. U.S. Pat. Nos. 4,413,432, 6,032,390, 6,216,368 and 6,668,472, for example, disclose different approaches for securing teeth to the adapters and/or the adapters to the lip.

Connections that are used in the applications described above, typically have a pin with a fixed head or screw-on nut which has a wider diameter than the pin so as to retain the pin in the connection point once inserted into aligning holes of the respective portions of the parts to be connected. Because of the environment in which earth-moving equipment operates, namely dirt, abrasive and high wear operating environments, the traditional pin is not easily removed from the connection point in the traditional sense where it must be backed out of the connection given its fixed head or screw-on nut. The task to remove the pin, under ideal conditions is time consuming and requires special tools for extracting the pin.

Other connection types include for example connecting a tooling bit such as a digging tooth to an adapter which in turn connects to the lip of a bucket. This type of connection in the prior art employs a clamping part which sits in openings of the respective components and is forced against a locking component by use of a hydraulic fluid to firmly secure the adapter or tool to the lip or bucket respectively. The hydraulic fluid system is difficult to maintain, is subject to leaking and is subject to high amount of abrasion and wear and tear given the environment in which the components are used. The present invention improves upon the systems of the past and is able to provide pressure forces for locking and restraining components together without the necessity of multiple tools and hydraulic fluid components for quick release operation.

There continues to be a need for connection systems that do not suffer from the shortcomings of the prior art.

BRIEF SUMMARY OF THE INVENTION

To overcome disadvantages of traditional connections used in power-driven earth-moving equipment, the embodiments of the present invention are directed to a locking mechanism that utilizes displacing mechanical features within tools, locks, pins and the like using an elastomer material.

The embodiments of the present invention are directed to connections utilizing locking mechanism for securing tools to adapters in which the adapters are secured to lips or other members of a wide variety of containers used in ground-handling equipment, such as loaders, shovels, buckets, dragline buckets and the like. While particularly suitable for earth moving equipment, the embodiments of the present invention can be used in any application where reliable connections are beneficial.

The present disclosure is directed to connections securing together at least two separate but corresponding components. The connections can be of a variety of types where any two or more components are joined and retained together. In the context of at least several embodiments, the connection is used for securing components of earth moving equipment, such as teeth, arms, tools, buckets, legs and/or other components at hinge joints or fixed connection points.

Earth-moving equipment, such as power-driven shovels, loaders, scoops, dippers and the like, have tools, arms, legs, buckets and other components, which are removably attachable to the earth-moving equipment for easy replacement, repair, maintenance and or modification of the use of the earth-moving equipment. The connections in accordance with the embodiments of the present invention are suitable and operable in environments involving earth, dirt, abrasives and the like given its reliability and its functionality allows for expeditious maintenance and repairs.

The connections in accordance with the invention are particularly advantageous in such environments because unlike connections of the prior art which used liquid hydraulics, among other systems, to create a force to apply pressure to a locking component for retaining the two components together, the connections herein utilize an elastomeric solid pressure member which deforms and in turn presses against pistons, forcing them through piston holes to interact with an engaging surface on the second component to restrain the first and second components together.

The use of elastomer ameliorates many problems with connections of the prior art including preventing rusting of components, elimination of messy hydraulic fluid which has a tendency to leak, use of higher building tolerances, lowering costs of production, isolation of vibration caused by digging and moving of materials prolonging life of materials, and preventing unwanted detachment of components during use, among other problems.

The elastomer can be displaced by any number of methods whereby a force is applied in a particular direction, and depending on the softness, malleability and elastomeric principles of the material, the material will displace in all unrestrained directions. When a mechanical feature, such as piston in a chamber, is placed within the range of displacement, the elastomer, by virtue of its displacement will exert a force to the mechanical feature, i.e. the piston, displacing it in a desired direction.

In some aspects, the embodiments of the present invention exploit the segmental motion of amorphous polymers that exists above their glass transition temperature to create a mechanical system where the amorphous polymer functions as the working fluid in a hydraulic circuit. A significant advantage of using the elastomer is the ability to create a piston and cylinder system where the economy of relatively large tolerances and clearances can be obtained, without the working element escaping—even over indefinite time periods.

Elastomer, such as polyurethane, with a hardness in the 30 to 60 Shore A range, has been utilized and it is reasonable to expect rubber or other elastomers to function similarly to polyurethane and to expect a useful hardness range to extend over nearly the whole range of the Shore OO scale, from softer than a racquet ball to harder than a tire, depending on the nature of the application. The inventors herein have discovered that for most of the applications disclosed below, generally for the same applied pressure, softer materials are more efficient but require smaller gaps to not escape; harder materials can bridge large gaps without escaping, but more work is necessary to deform them.

Many embodiments are related to a securing apparatus that includes a first component and a second component. The first component has an elongated member with an opening extending along a central axis. The opening is formed by a first portion, a second portion adjacent to the first portion, and a bottom surface. The elongated member has a piston hole extending along a lateral axis, penetrating the first component and aligned with the second portion of the opening. A piston is located within the piston hole, and is complimentary shaped to sit within the piston hole such that the piston can move along the piston hole axis. A first pressure member is located within the second portion of the opening, and an activator is configured to coordinate with and extend into the first portion of the opening. When activated, the activator applies a force to the pressure member to distort the pressure member. The second component compliments and mates with the first component and has an engaging surface shaped to coordinate with an end of the piston. In operation, the force applied to the pressure member by the activator causes the pressure member to distort and apply pressure to the piston to extend the piston outward from the first component causing the piston to interact with the engaging surface of the second component to restrain the second component.

Many embodiments are related to a connector pin and nut assembly where there is a pin and the pin has a first end and a second end. The first end of the pin has an opening that elongates into the pin and is formed by a first portion, which is threaded and located near the first end of the pin, and a second portion adjacent to the first portion. The pin also has at least one piston hole penetrating the pin laterally to align with the second portion of the opening. The pin has at least one piston aligned within the at least one piston hole that is complimentary shaped to engage the at least one piston hole such that only a portion of the at least one piston can extend outward from the pin. A pressure element is located at the second portion of the opening and an activator having a threaded shank adapted to coordinate with and extend into the opening to apply a force to the pressure element is located in the opening above the pressure element. A nut that has a body and an aperture extending through the body with an aperture groove encircling the aperture and shaped to engage the at least piston when the at least piston extends from the pin rests about the pin. In operation, the force applied to the pressure element by the activator causes the pressure member to distort to apply pressure to the at least one piston to extend the at least one piston outward from the pin and into the aperture groove to restrain the nut to the pin.

In many embodiments related to the various embodiments of the pin and nut assembly, the groove in the aperture of the nut only partially encircles said aperture.

In many embodiments related to the various embodiments of the pin and nut assembly, a nut-stopper located on the pin between the first end of the pin and the piston holes.

In many embodiments related to the various embodiments of the pin and nut assembly the nut-stopper is an o-ring located in an o-ring groove encircling the pin between the first end of the pin and the piston holes.

In many embodiments related to the various embodiments of the pin and nut assembly, a pressure element restraint is located in the opening which prevents the pressure element from removal from the opening unless the pressure element restraint is disengaged or removed.

In many embodiments related to the various embodiments of the pin and nut assembly, the pressure element restraint is at least one secondary pin installed in a hole which penetrates the pin transverse to the opening and between the pressure element and the first end of the pin.

Many embodiments are related to an adapter and tool assembly for attaching tools to earth moving equipment. The assembly can include an adapter that has a body with a first end configured to couple with a tool. The adapter has and opening penetrating the body. The opening is formed by a first portion located near the first end of the body, a second portion adjacent to the first portion, an axis, and a bottom surface. The body has a piston hole extending along an axis penetrating the adapter and aligned with the second portion of the opening. A piston is located within the piston hole and is complimentary shaped to sit within the piston hole such that the piston can move along the piston hole axis. A first pressure member is located within the second portion of the opening. An activator is configured to coordinate with and extend into the first portion of the opening, which applies a force to the pressure member to distort the pressure member. The tool is configured to compliment and couple with the adapter, and has an engaging portion shaped to align with the piston hole and coordinate with an end of the piston. In operation, the force applied to the pressure element by the activator causes the pressure member to distort and apply pressure to the piston to extend the piston outward from the adapter causing the piston to interact with the engaging portion of the tool to restrain the tool to the adapter.

Many embodiments are related to an adapter and bucket assembly for attaching tools to buckets of earth moving equipment. The assembly can include an adapter that has a body with a first end configured to couple with a bucket lip. The adapter has an opening penetrating the body. The opening is formed by a first portion located near the first end of the body, a second portion adjacent to the first portion, an axis, and a bottom surface. The body has a piston hole extending along an axis penetrating the adapter and aligned with the second portion of the opening. A piston is located within the piston hole and is complimentary shaped to sit within the piston hole such that the piston can move along the piston hole axis. A first pressure member is located within the second portion of the opening. An activator is configured to coordinate with and extend into the first portion of the opening, which applies a force to the pressure member to distort the pressure member. The bucket is configured to compliment and couple with the adapter and has an engaging portion shaped to align with the piston hole and coordinate with an end of the piston. In operation, the force applied to the pressure element by the activator causes the pressure member to distort and apply pressure to the piston to extend the piston outward from the adapter causing the piston to interact with the engaging portion of the tool to restrain the tool to the adapter.

Many embodiments are related an adapter and bucket assembly for attaching tools to earth moving equipment with the use of a locking clamp. This assembly includes a locking clamp that has a body with a mating side, a clamping side and an opening that elongates into the body. The opening is formed by a first portion which is threaded and located near the first end of the body and a second portion adjacent said first portion. The body has at least one piston hole extending along a lateral axis penetrating the locking clamp on the clamping side and aligned with the second portion of the opening. There is at least one piston located within the at least one piston hole, which is complimentary shaped to sit within the piston hole such that the piston can move along the at least one piston hole axis. A pressure member is located in the second portion of the opening; and an activator is configured to coordinate with and extend into the first portion of the opening wherein the activator applies a force to distort the pressure member. There is an adapter has a first engaging opening shaped to coordinate with the clamping and locking sides of the locking clamp and a bucket lip portion configured to compliment and couple with the adapter, where the bucket lip portion has a second engaging opening shaped to coordinate with the clamping and locking sides of the locking clamp. There is a clamping wedge having a clamping surface and an engaging surface opposite the clamping surface where the engaging surface is configured to align with the piston hole and coordinate with an end of the at least one piston. In operation, the force applied to the pressure element by the activator causes the pressure member to distort and apply pressure to the at least one piston to extend the at least one piston outward from the locking clamp causing the at least one piston to interact with the engaging surface of the clamping wedge to restrain the adapter to the bucket lip.

In many embodiments related to the adapter and bucket assembly using the locking clamp there is a locking wedge that has a pressing surface and a wedging surface opposite the pressing surface where the wedging surface is configured to oppose and coordinate with the clamping surface of the clamping wedge and the pressing surface configured to compliment and coordinate with the bucket lip opening and adapter opening.

Many embodiments are related a method for securing a first component to a second component. The steps of the method comprising include connecting a first component to a second component. The first component has an elongated member with an opening extending along an central axis, and the opening is formed by a first portion, a second portion adjacent to the first portion, and a bottom surface. The elongated member has a piston hole extending along a lateral axis, penetrating the first component and aligned with the second portion of the opening. A piston is located within the piston hole and is complimentary shaped to sit within the piston hole such that the piston can move along the piston hole axis. A first pressure member is located within the second portion of the opening, and an activator is configured to coordinate with and extend into the first portion of the opening. When activated, the activator applies a force to the pressure member to distort the pressure member. The second component compliments and mates with the first component, and has an engaging surface shaped to coordinate with an end of the piston. In operation, the force applied to the pressure member by the activator causes the pressure member to distort and apply pressure to the piston to extend the piston outward from the first component causing the piston to interact with the engaging surface of the second component to restrain the second component.

In many embodiments related to the various embodiments above the activator has male threads on its exterior and the first portion of the opening has female threads on its interior which complement the male threads of the activator.

In many embodiments related to the various embodiments above, a torsion isolator is located between the activator and the pressure member that in operation prevents torsional forces applied by the activator from transmitting to the pressure member.

In many embodiments related to the various embodiments above, a second pressure member can be located between the first pressure member and the bottom of the opening.

In many embodiments related to the various embodiments above the second pressure member is cylindrical.

In many embodiments related to the various embodiments above second pressure member located between the first pressure member and the bottom of the opening.

In many embodiments related to the various embodiments above, a set screw is installed in the second portion of the opening and the bottom surface of the opening is established by the end of the set screw.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 9A is a top view of the connection of FIG. 8.

FIG. 9B is a cross section view of section B-B of the connection of FIG. 9A.

FIG. 10 is a cross section view of section A-A of the connection of FIG. 8.

FIG. 12 is a top view of the connection of FIG. 11.

FIG. 13 is a cross section view of section A-A of the connection of FIG. 12.

DETAILED DESCRIPTION OF THE DRAWINGS

Figure 1:
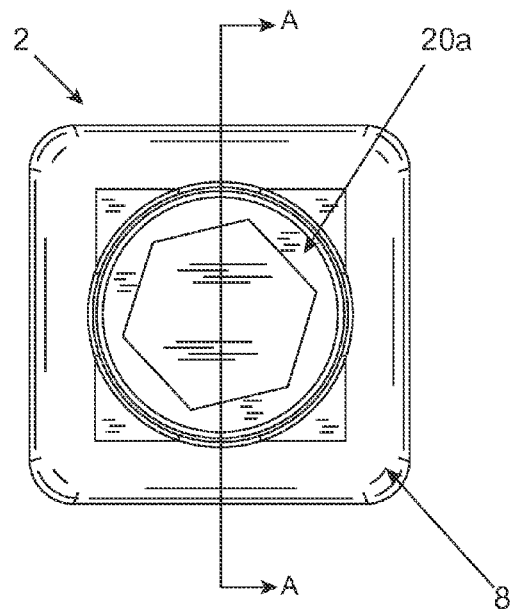
FIG. 1 is a top view of a pin and nut assembly constructed in accordance with the disclosed embodiments of the present invention.
Figure 2:
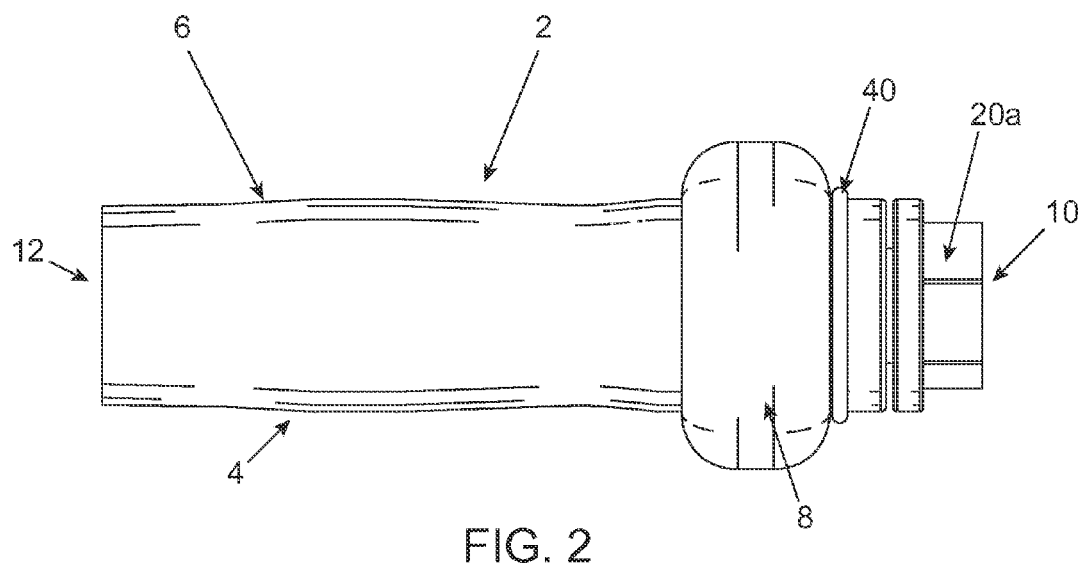
FIG. 2 is a side view of a pin and nut of FIG. 1.

Referring to FIGS. 1-4, one embodiment having of a connector nut and pin assembly 2 constructed in accordance with the present embodiment has a pin 4 with a variable diameter shaft extending a predetermined distance and a cooperating nut 8. Pin 4 has a first end 10 and a second end 12. The first end 10, at the pin's "upper end", extends coaxially towards second end 12, the "lower end", as illustrated in FIG. 1. The first end 10 of pin 4 has an opening 14, which penetrates the pin 4, coaxially thereto, to a predetermined depth.

The opening 14 has a first portion 16, which is nearest the first end 10 of the pin 4. The opening 14 further has a second portion 18, which is adjacent to the first portion 16. The first portion 16 of the opening 14 is threaded to engage the activator 20 described in greater detail below. The second portion 18 may or may not be threaded. In the embodiment shown the second portion 18 is not threaded. An o-ring groove 22, in the first end 10 of the pin 4, encircles the opening 14 and houses an o-ring 24.

In the region of the second portion 18 of the opening 14 two piston holes 26a penetrate the pin 4 laterally. These piston holes 26a are conically shaped with a wide portion 28 of each piston hole 26a located at an intersection with the opening 14. An intersection with the pin exterior sidewall 8 is smaller in diameter than the wide portion 28 of the piston hole 26a.

Two pistons 30a are seated within the two piston holes 26a. The pistons 30a are semi-conical with tapered sidewalls and rounded tips. The pistons 30a are complimentary shaped to the piston holes 26a in order to align and rest within the piston holes 26a. The diameter of the base 32 of the piston 30a however is larger than the diameter of the piston hole 26a to prevent each piston 30a from being able to be pushed completely out of its respective piston hole 26a from the inside. In other words, each piston 30a is configured to be moveable within its respective piston hole 26a in an outward and inward direction but is limited in its outward direction by the size of the piston hole 26a.

Seated within the second portion 18 of the opening 14 is a pressure element 34a. In the embodiment shown the pressure element 34a is roughly the thickness and diameter of the second portion 18 itself such that the pressure element 34a is able to be installed without too much difficulty but that the second portion 18 of the opening 14 is mostly filled by the pressure element 34a.

The activator 20a, as shown is configured as a bolt. The activator threads are complimentary shaped to the threads in the opening 14. The activator 20a, shown here is commonly referred to as a hex head flange bolt.

Nut 8 may have a variety of exterior dimensions and configurations to suit particular applications. The nut 8 illustrated in FIG. 1 is squared with rounded corners for ease of handling. The nut 8 has a body with an aperture 36 that penetrates the center of the nut through the body. The aperture 36 has a groove 38, shaped so that it engages the rounded tips of the pistons 30a when located about the pin 6 in the region of the piston holes 26a and when the pistons 30a extend from the pin 6. In the embodiment shown the groove 38 completely encircles the aperture 36 but it should be readily apparent to one skilled in the art that other configurations can be used so long as the pistons 30a engage the groove 38 when in use.

Figure 3:
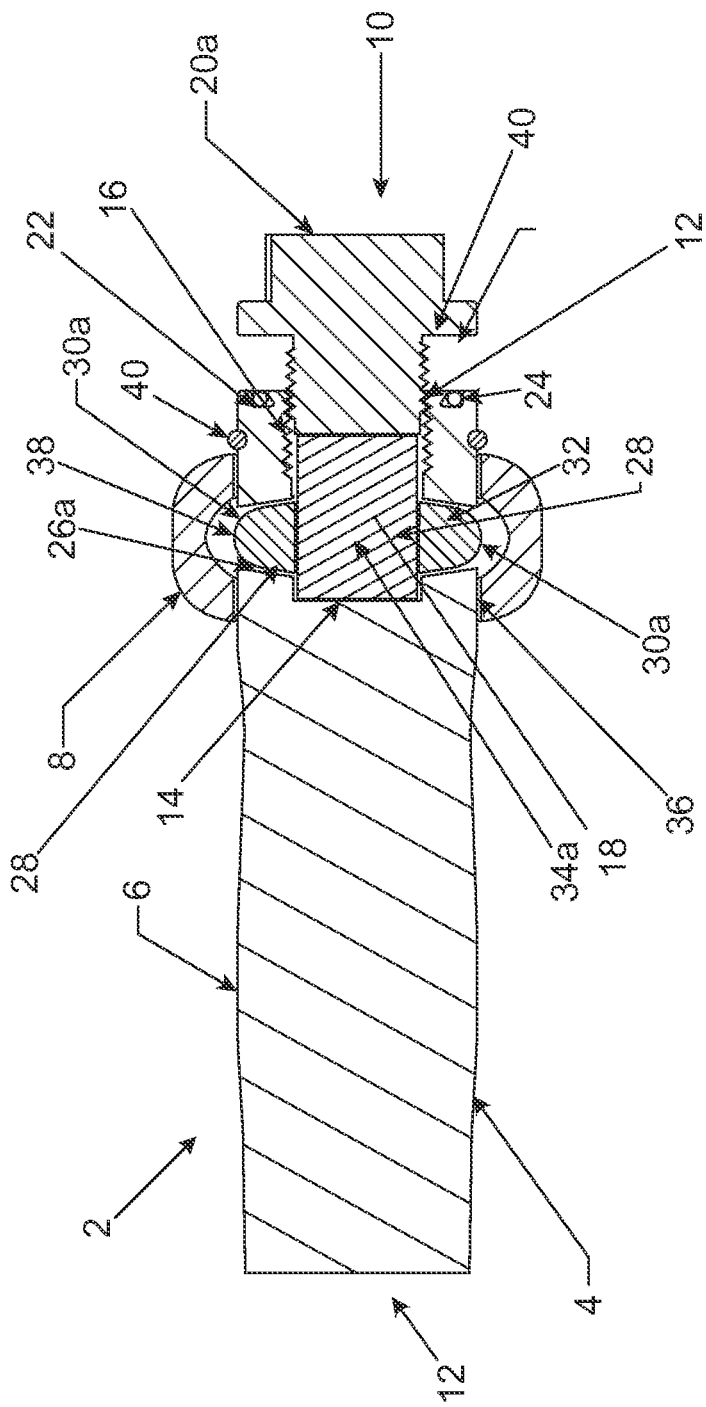
FIG. 3 is a cross sectional view of the section A-A identified in FIG. 1 showing the internal portions of the assembly of FIG. 1 in an inactivated state with the pressure member uncompressed and the pistons seated in the bottom of the piston holes, disengaged from the aperture groove of the nut.
Figure 4:
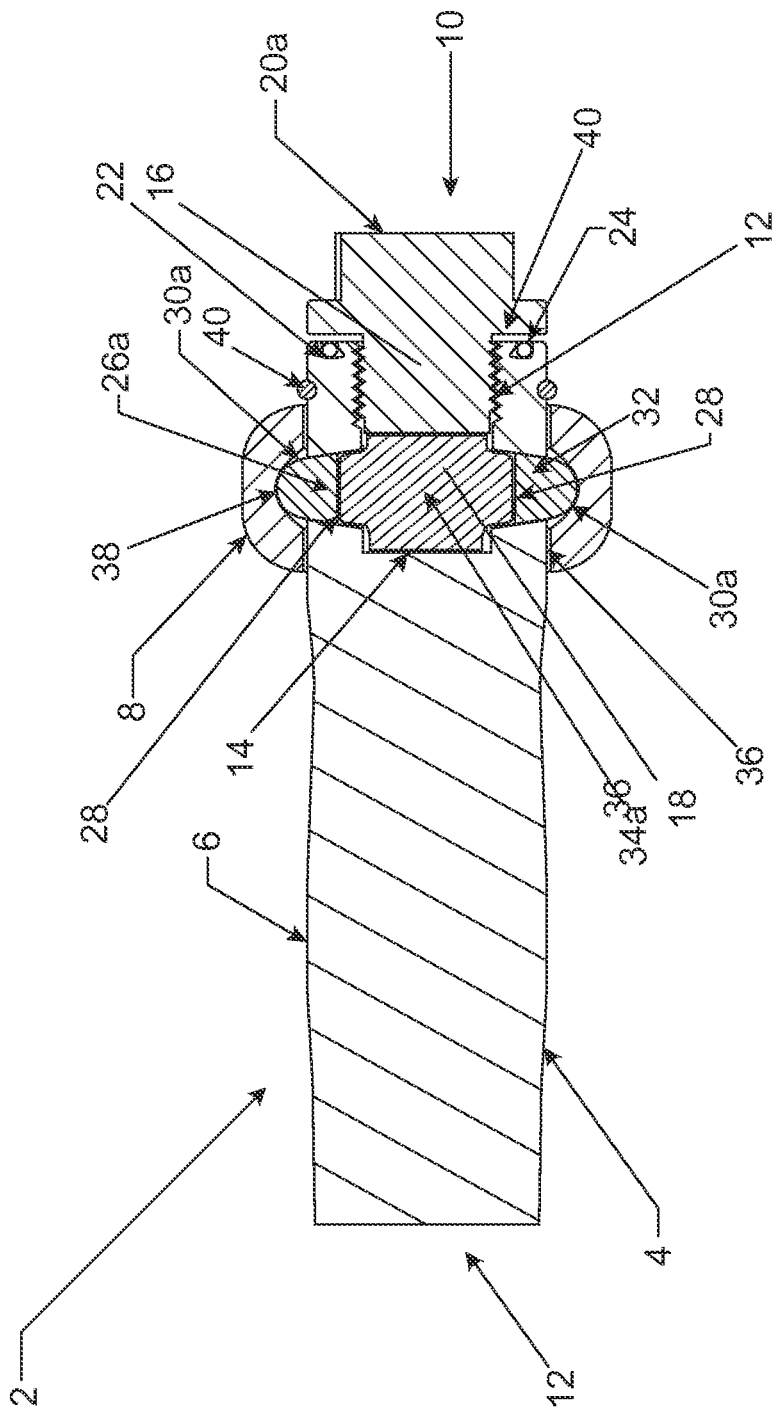
FIG. 4 is a cross sectional view of the section A-A identified in FIG. 2 showing the internal portions of the assembly of FIG. 1 in an activated state with the pressure member being compressed by the tightened activator and the pistons being pressed outward in the piston holes to engaged the aperture groove of the nut.

As can be seen in FIGS. 3 and 4, the pin and nut assembly 2 in the embodiment described and shown is assembled and operates as follows. The pistons 30a are installed and aligned within the piston holes 26a with the narrower rounded tips pointing in the outward direction so that when pushed toward the outside of the pin 6 from the inside, the pistons 30 extend from the pin exterior sidewall 8. At this point, the pistons 30a are free to move inward or outward and are only constrained in the outward direction by the geometry and size of the pistons 30a and the piston holes 26a. As seen in FIG. 3, the pressure element 34a is seated into the second portion 18 of the opening 14. The activator 20a is then inserted into the opening 14 where the threads of the activator 20a engage the threads of the first portion 16 of the opening 14. The nut 8 is slid over the pin 4 so that the groove 38 of the aperture 36 of the nut 8 generally aligns with the piston holes 26a of the pin 4.

As shown in FIG. 4, in operation, the activator 20a is tightened and as such it compresses and deforms pressure element 34a. The pressure element 34a, being deformed, expands in all unrestrained directions. The pressure element 34a is dimensioned to fit in the opening 14 so that when it deforms it primarily deforms and into the piston holes 26a and against the pistons 30a pressing the pistons 30a outward laterally.

Thus, when the force of the activator 20a is applied to the pressure element 34a, the pressure element 34a deforms. The pistons 30a are then forced to protrude from the pin 4 to engage with the groove 38 of the aperture 36 of the nut 8, thereby restraining the nut 8 from sliding laterally off the pin 4. Compression of the pressure element 34a and the corresponding pressing force on the pistons 30a is sufficiently strong that the nut 8 cannot be removed from the pin 4 unless the activator 20a is backed out of the pin 4 and/or either the pistons 20a or the nut 8 are permanently damaged or sheered.

While not required, the pin 4, in some embodiments and as shown here, also has an o-ring 40 encircling the outer circumference of the pin 4 above the pistons holes 26a and below the top of the pin. The o-ring 40 acts as a locating stop for the nut 8 to align the nut 8 with the pistons 30a.

The volume of the pressure member 34a and its dimensions, related to the dimensions of the opening 14 in connection with the elasticity and stiffness of the pressure member determines the required force with which the pistons are pressed outward and thus the amount of locking force that is exerted in locking the nut 8 to the pin 4.

Figure 5:
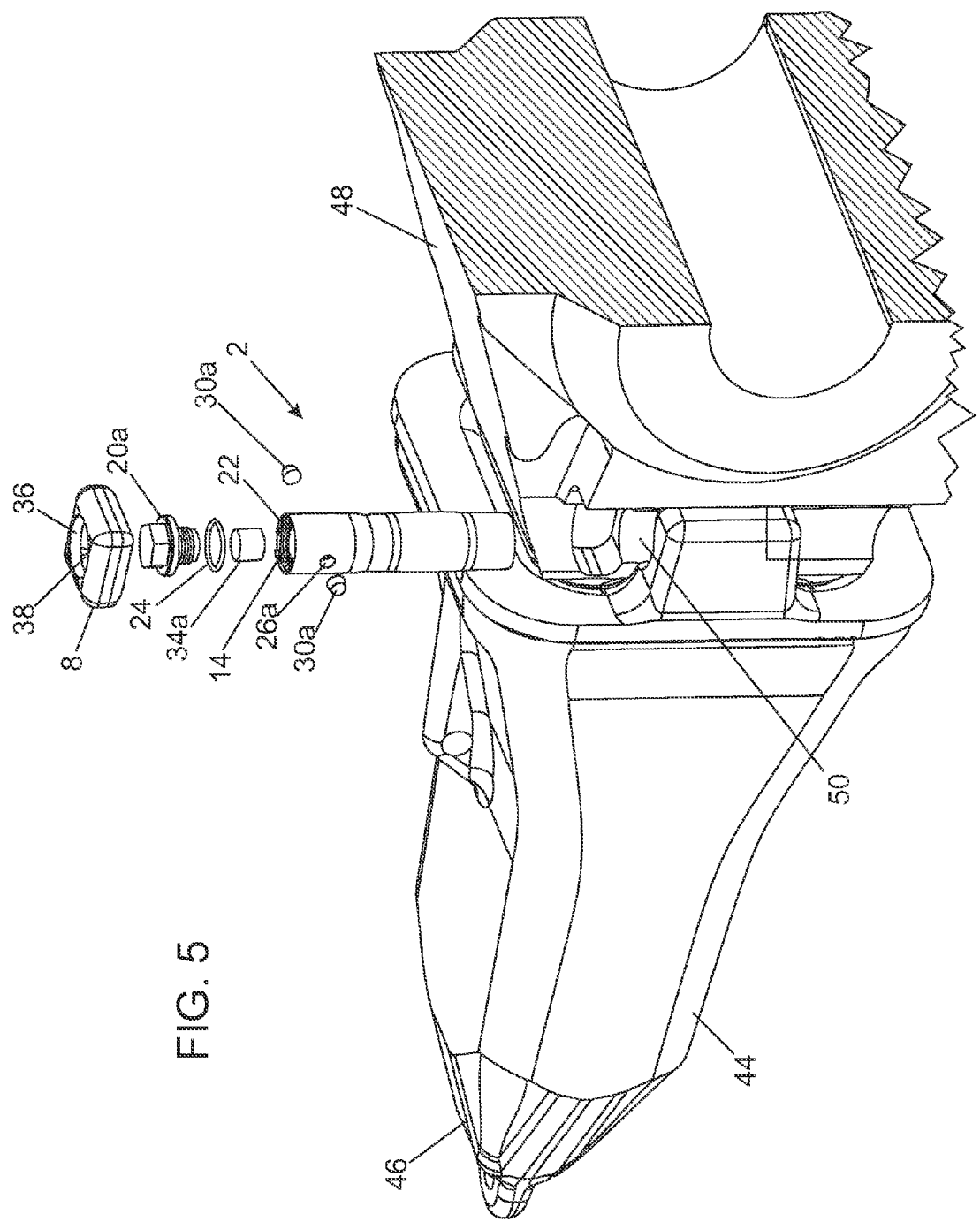
FIG. 5 is a perspective view of an adapter and digging tooth connection utilizing the quick release pin and nut assembly of FIG. 1.
Figure 6:
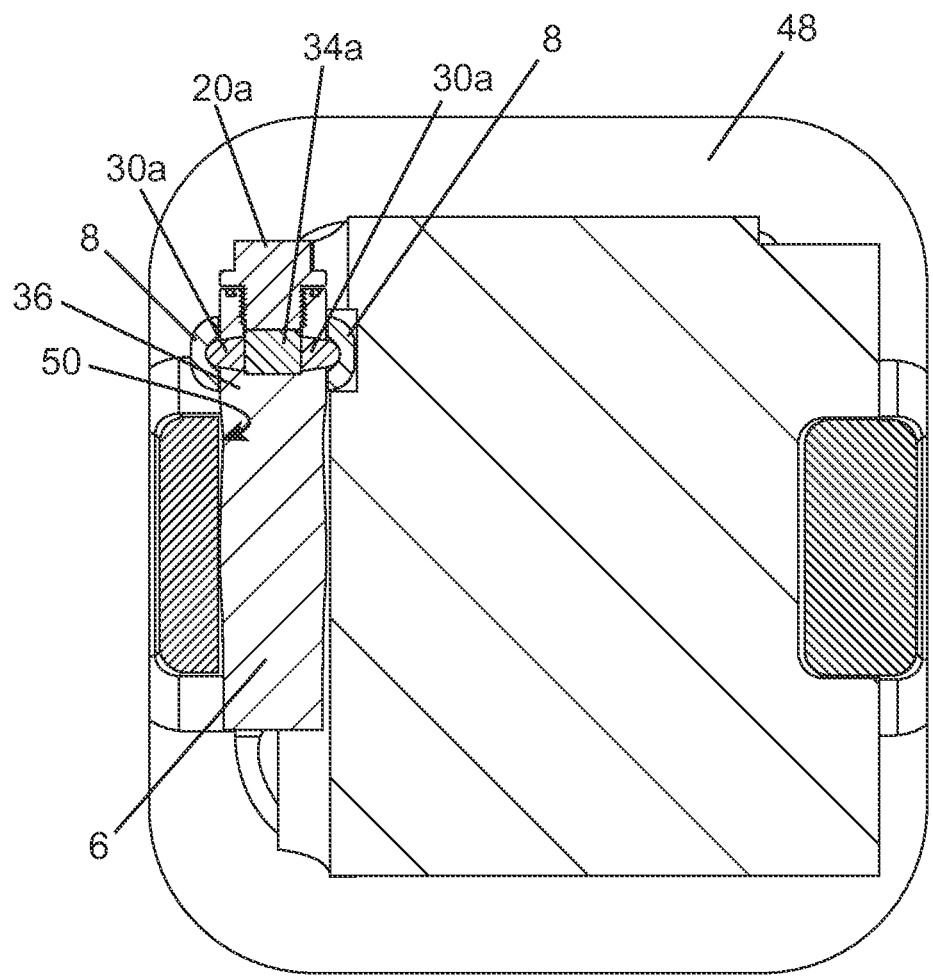
FIG. 6 is a back side cross section view of the connection of FIG. 5.
Figure 7:
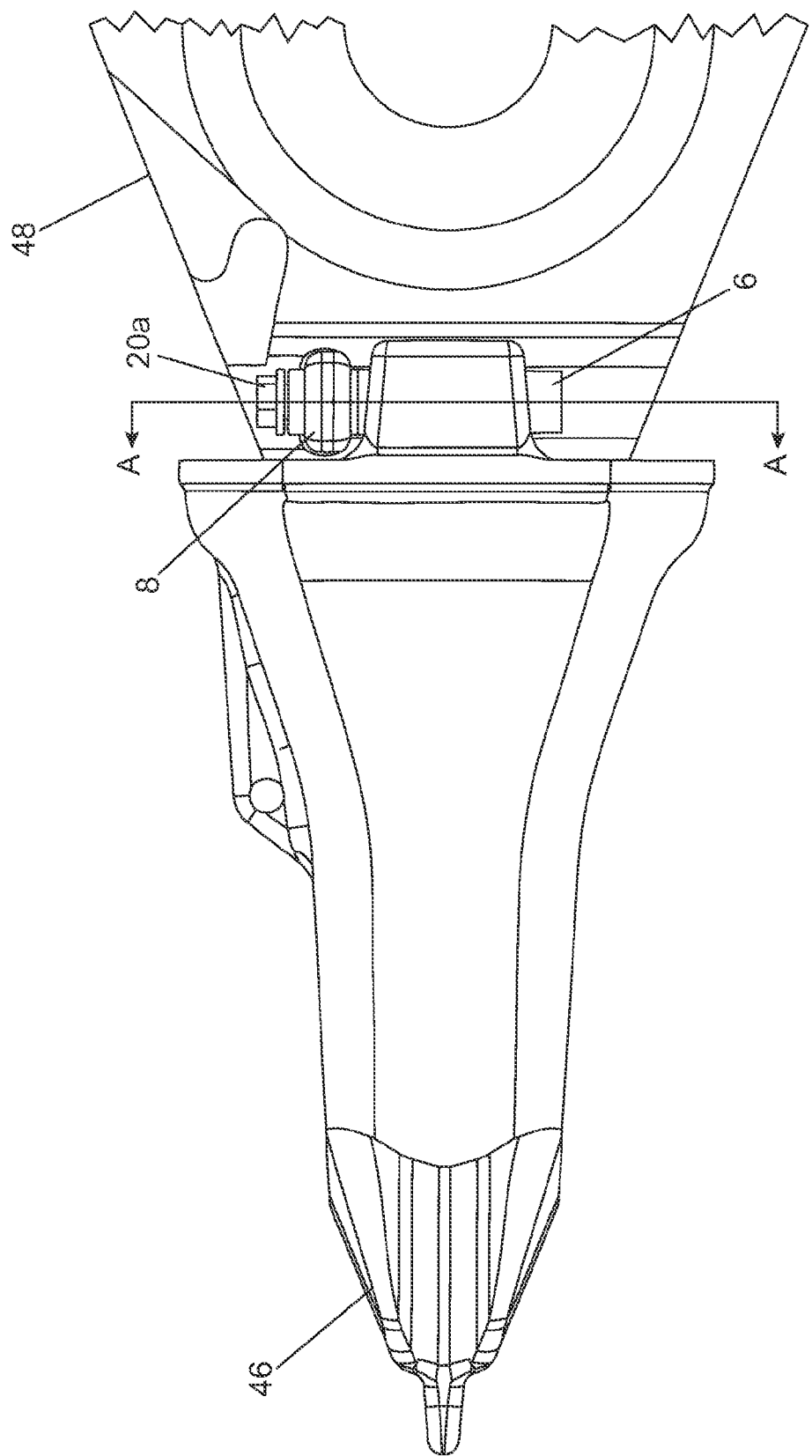
FIG. 7 is a side view of the connection of FIG. 5.
Figure 8:
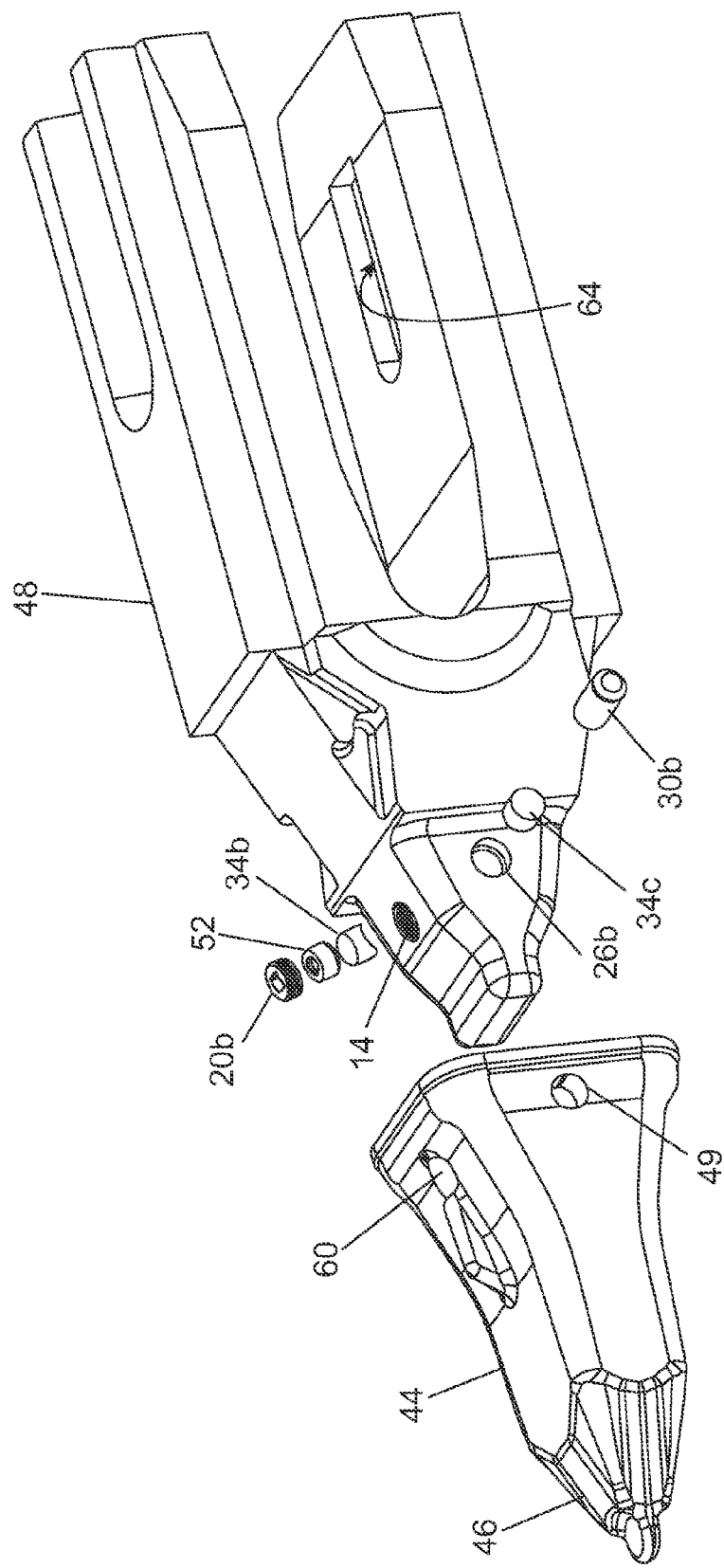
FIG. 8 is a perspective view of a connection in accordance with the invention for connecting a digging tooth to an adapter.

FIGS. 5-7 show the pin and nut assembly 2 in use for connecting a digging tooth 44 to an adapter 48. The digging tooth 44 can also be attached to an adapter 48 using the locking mechanism in accordance with the invention in a different configuration as shown in FIGS. 8-10 which is discussed later. With regard to FIGS. 5-7, FIG. 5 shows an exploded view of the pin and nut assembly 2 with all its components aligned with receiving openings 50 and 51 of the digging tooth 44 and adapter 48, respectively. FIGS. 6 and 7 show the pin and nut assembly 2 in the activated state where the pressure element 34a has been compressed by the activator and as described above therefore retains the nut 8. The pin and nut assembly 2 as shown installed in receiving openings 50 and 51 of the tooth 44 and adapter 48, respectively.

FIGS. 8-10 show an alternative embodiment of a connection type for firmly securing a digging tooth to an adapter, for example. The tooth 44 has a tapered strengthened tip 46, which is used as a working end of the tooth 44. Opposite the tip 46, the tooth 44 has a hollowed body 47 so that it can fit over the end of the adapter 48. The tooth 44 has an engaging hole 49 at a side transverse to the axis of the opening 14, which acts as an engaging surface for engaging with the piston 30 of the locking mechanism of the adapter 48. The engaging hole 49 is similar to the groove 38 of the pin and nut assembly 2. There is a clearance hole 60 in the tooth 44, which aligns with the opening 14 in the adapter 48 when the tooth 44 is placed on the adapter 48.

The first elastomer pressure member 34b is installed the opening 14 of the adapter 48 which is like the pin and nut assembly opening 14. The activator 20b is installed in the opening 14 with a torsional isolator 52 being located between the first pressure member 34b and the activator 20b to prevent transmission of the torsional stresses exerted by the tightening of the activator 20b on the first pressure member 34b. The torsional isolator 52 can be a cylindrical plug of a relatively low friction material, such that when the activator 20b is tightened the activator 20b slips against the torsional isolator 52 so that only vertical pressure is applied to the pressure member via the torsional isolator 52 by way of tightening of the activator 20b. Other types of mechanisms can also be used to prevent the torsional forces from being transmitted to the pressure element 34b.

Under the first pressure member 34b in the opening 14 is a second elastomer pressure member 34c, which is cylindrical and aligned coaxially with the piston hole 26, which is transverse to the opening 14. In other words the first pressure member 34c is coaxial with the opening and transverse to the piston hole 26b whereas the second pressure member 34c is transverse to the opening and co-axial with the piston hole 26b. The second pressure element 34c and the first pressure element 34b can be of similar or differing elastomer materials. As can be seen in FIG. 7, the first pressure member 34b has a curved bottom end to partially encircle the second pressure member 34c. This is to minimize the gaps in the opening 14 and piston hole 26b as the pressure elements, when compressed, will deform in all un-constrained directions and large gaps will require large deformation of the pressure members to obtain the desired displacement and force for pushing the pistons 30 outward.

As with the pin and nut assembly 2 described above, tightening of the activator 20 compresses the first pressure member 34b. In this embodiment, the first pressure member 34b then compresses and distorts the second pressure member 34c. The second pressure member 34b deforms in the direction of the piston hole 26 where the piston 30 is located, forcing the piston 30b outward to engage the hole 49 in the tooth 44. As with the pin and nut assembly 2 compression of the pressure elements 34b and 34c and corresponding pressing force on the piston 30b is sufficiently strong that the adapter 48 cannot be removed from the tooth 44 unless the activator 20 is backed out of the adapter 48 and/or either the pistons 30b or the tooth 44 are permanently damaged or sheered.

Figure 11:
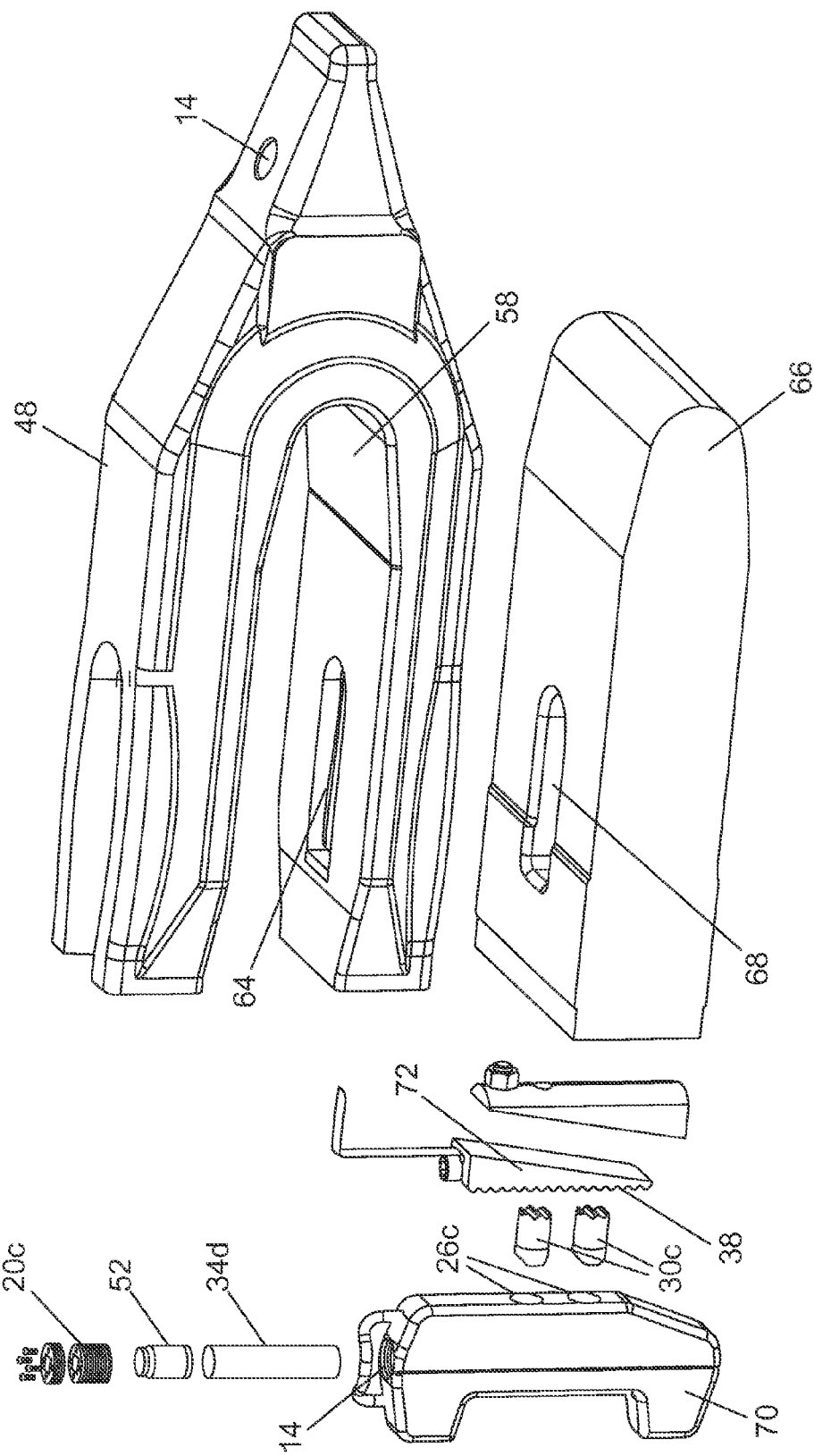
FIG. 11 is an exploded assembly view of a connection in accordance with the invention for connecting an adapter to a bucket lip using a c-clamp.
Figure 14:
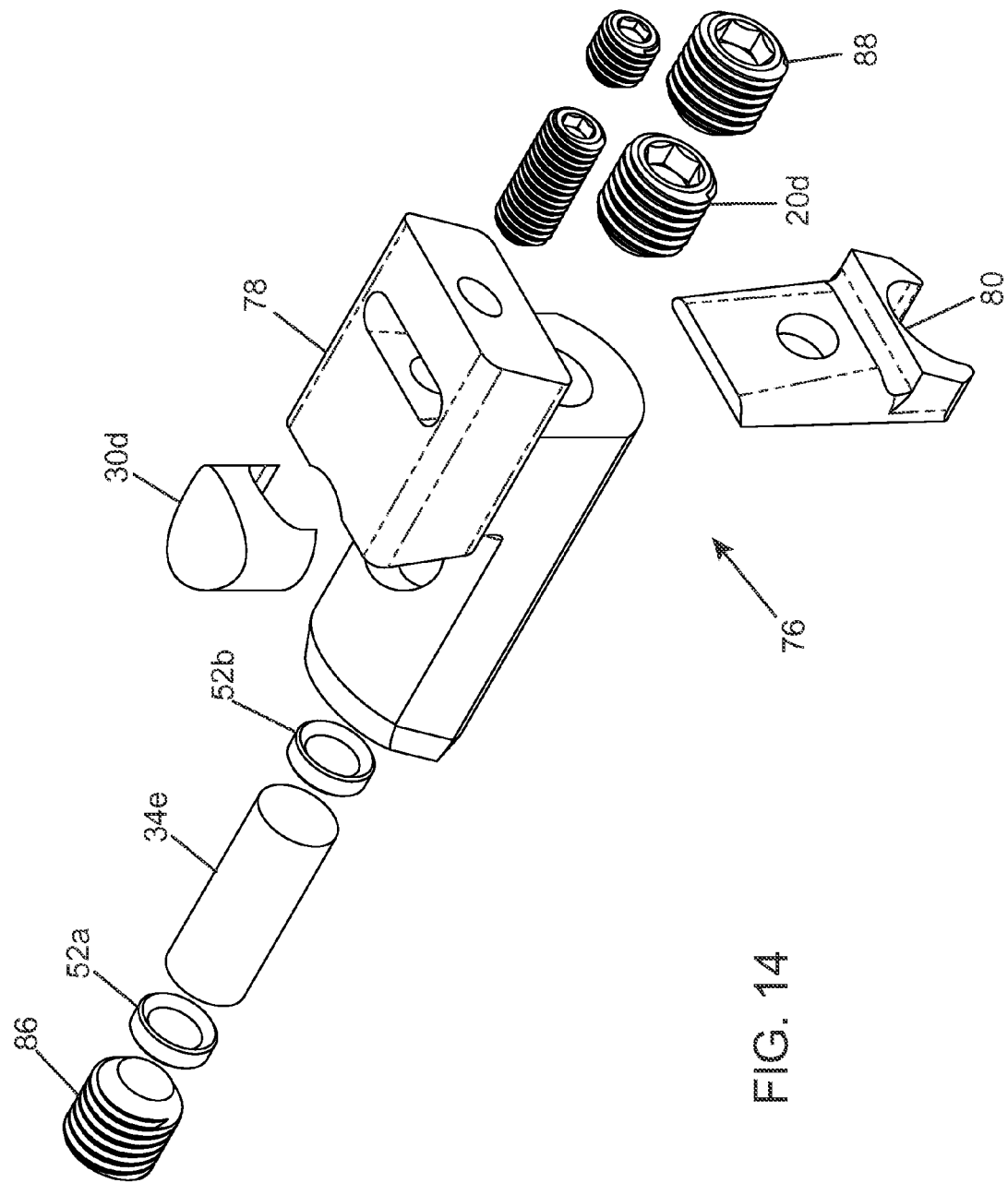
FIG. 14 is an exploded assembly view of a connection fastening clip in accordance with the invention for connecting an adapter to a bucket lip.
Figure 16:
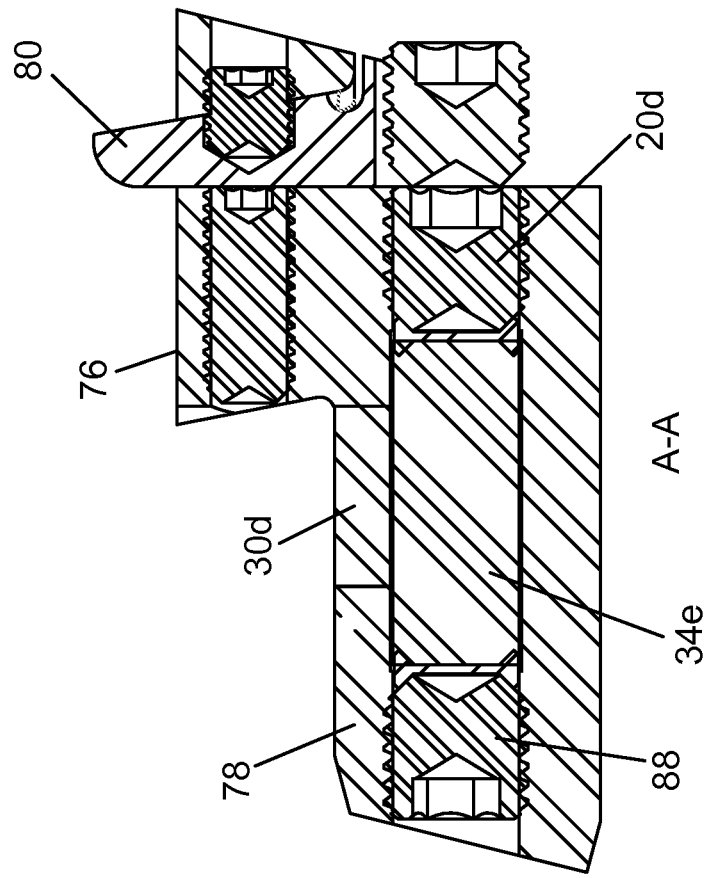
FIG. 16 is a cross section view of section A-A of the connection of FIG. 14.
Figure 15:
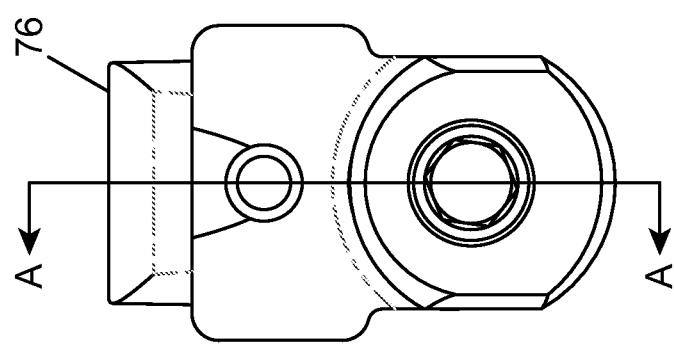
FIG. 15 is a front view of the connection of FIG. 14.
Figure 17:
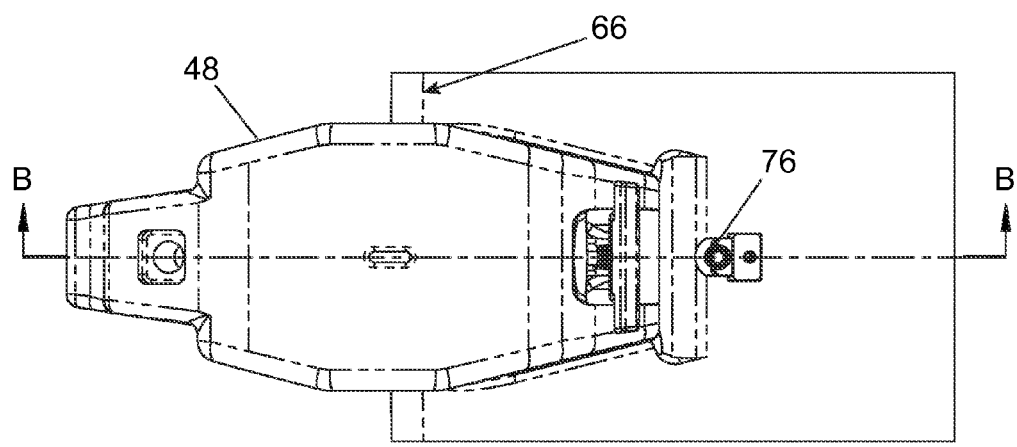
FIG. 17 is a top view of the connection of FIG. 14 in use connecting an adapter to a lip.
Figure 18:
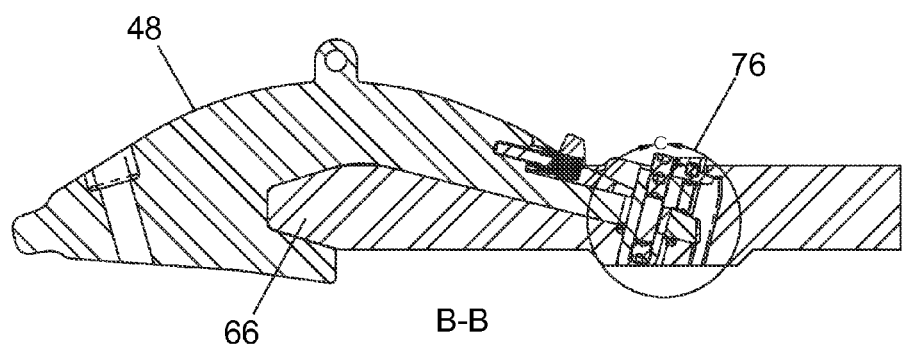
FIG. 18 is a cross section view of section A-A of the connection of FIG. 14 connecting an adapter to a lip.
Figure 19:
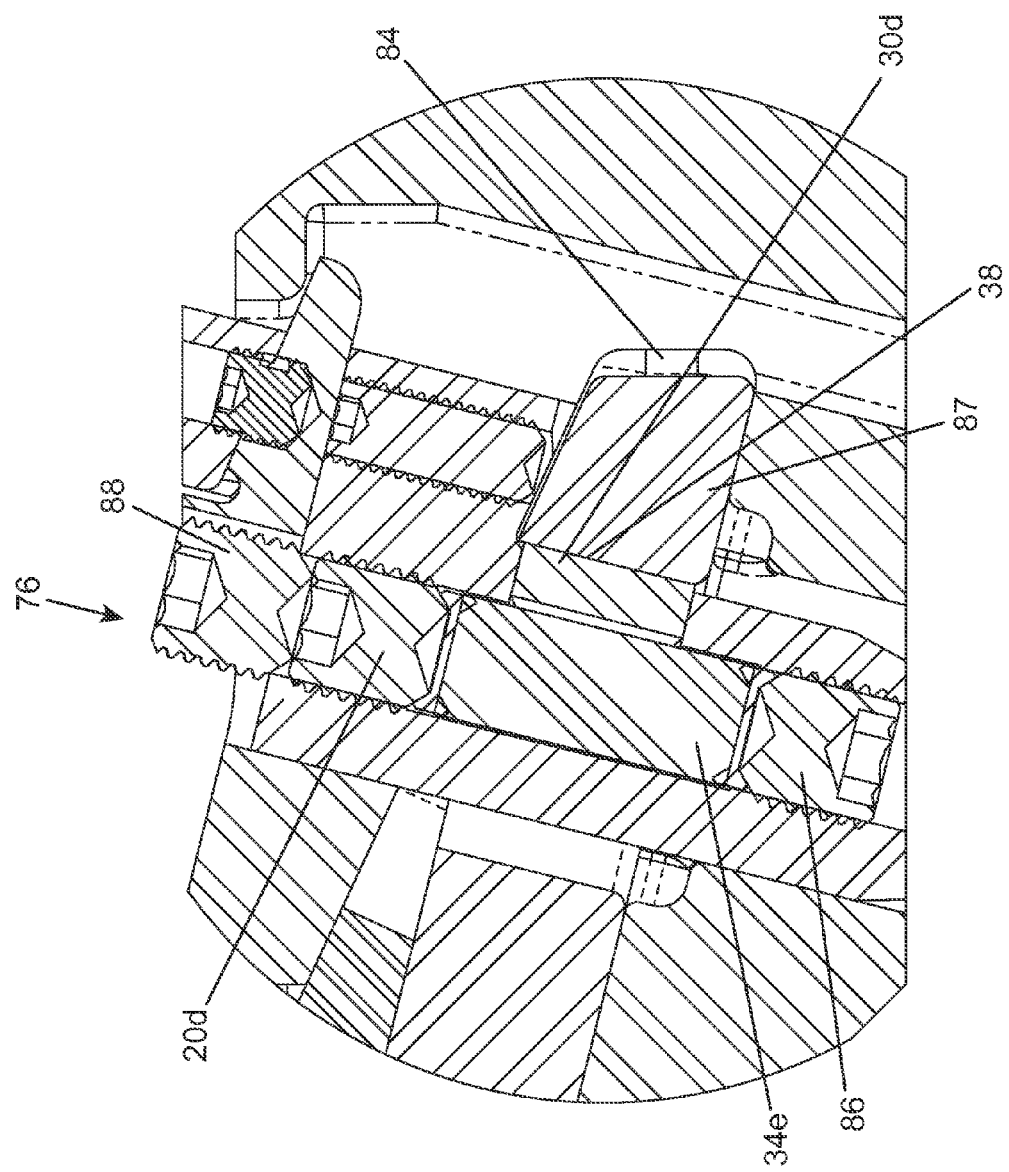
FIG. 19 is a cross section detail view of section A-A of the connection of FIG. 14 connecting an adapter to a lip.

In another embodiment, as shown in FIGS. 11-13, an adapter 48 detachably carries a digging tooth 44 at its front end to a lip 66 of an excavating container of excavating equipment which is only partially shown for illustration purposes. The adapter 48 is shaped to rest on and cover a portion of the end of the lip 66. A lip opening 68 in the lip aligns with an opening 64 in the adapter 48. This lip opening 68 is configured to coordinate with a c-clamp 70, which restrains the adapter 48 to the lip 66 when restrained by the locking mechanism in accordance with the invention.

Like in the pin and nut assembly 2 and tooth 44 to adapter 48 embodiments described above, a pressure element 34d is arranged inside an opening 14 with an activator 20c installed above the pressure element 34d in the c-clamp 70. Two horizontal piston holes 26c are aligned one above the other along the axis of the opening penetrate the side of the c-clamp 70. Two pistons 30c arranged in the piston holes 26c have teeth on their ends which coordinated with an engaging wedge 72. The engaging wedge 72 has an engaging surface 38, which has teeth that are complimentary to the teeth of the ends of the pistons 30c. The engaging wedge 72 and c-clamp 70 are situated in the opening 64 of the adapter and on the lip 66 such that when the activator 20 is tightened into the c-clamp 72, the pressure element 34d is compressed and deforms, pushing the two pistons 30c outward to engage to force the engaging wedge 72 against the walls of the opening 64 of the adapter and the opening 68 of the lip to firmly restrain the adapter to the lip 66.

Another alternative embodiment for connecting an adapter to a lip is shown in FIGS. 14-19 which illustrate another locking mechanism similar to the c-clamp connection described above. As can be seen a fastening clip 76 uses the locking mechanism in accordance with the invention. The fastening clip 76 is made up of two pieces; a block 78 and plate 80. As in the other embodiments the fastening clip 76 has an opening 14 in the block. In this case the opening 14 is a through hole and a set screw 86 is installed in the opening 14, which creates a bottom to the opening 14. At the other end of the opening 14, a screw acts as the activator 20d for compressing the pressure member 34e and the upper screw 88 acting to cover and protect the activator 20d and to lock the plate 80 on the fastening clip 76.

A Torsional isolator 52 are installed between the activator 20d and the pressure member 34e. A second torsional isolator 52 is also installed between the set screw 86 and the pressure element 34e. In this particular embodiment compression of the pressure element 34e can be accomplished by movement of either the activator 20d or the set screw 86. Transverse to the pressure member 34e is a piston 30d installed in a piston hole 26d in the fastening clip 76, which is transverse to the opening 14 in which the pressure member 34e is seated. Various other features on the fastening clip 76 allow the fastening clip 76 to be aligned with coordinating features of the lip 66 and adapter 48. When the fastening clip 76 is installed in a receiving portion of the adapter 48, a second locking component 82 is installed opposite the piston 30d and aligned with a recessed engaging portion 84 of the adapter 48. As in the other embodiments, tightening the activator 20d applies compression force to the pressure member 34e, which deforms and in turn presses the piston 30d laterally outward. The piston 30d then presses the locking component 82 into the recess 84 of the adapter 46, restraining the fastening clip 76 and the adapter 48 to the lip 66 of the bucket or other equipment part.

As is disclosed above, the advantageous use of a solid elastomeric material for the secure, affirmative locking of work pieces while not requiring the needed constant supply of a hydraulic fluid for connections in accordance with the embodiments of the present invention, which further enable the secure and yet simplified removable assemblies for high-wear components of earth-engaging, ground-moving and excavating equipment, as exemplified above.

While the embodiments described herein all illustrate the piston holes and pistons being transverse to the opening and activator hole, it is envisioned that the same principles can be applied where the pistons are aligned and linear with the activator.

The above descriptions are illustrative and is not restrictive. A recitation of "a", "an" or "the" is intended to mean "one or more" unless specifically indicated to the contrary. Many variations of the disclosure will become apparent to those skilled in the art upon review of the disclosure. One or more features from any embodiment described herein may be combined with one or more features of any other embodiment without departing from the scope of the disclosure. As will be understood by those skilled in the art, the present invention may be embodied in other specific forms without departing from the essential characteristics thereof. These other embodiments are intended to be included within the scope of the present invention, which is set forth in the following claims. The scope of the disclosure should, therefore, be determined not with reference to the above description alone, but instead should be determined with reference to the pending claims along with their full scope or equivalents.

What is claimed is:

1. An securing apparatus comprising a first component and a second component, the first component comprising:
   an elongated member having an opening extending along a central axis, the opening formed by a first portion, a second portion adjacent said first portion, and a bottom surface,
   the elongated member having a piston hole extending along a lateral axis, the piston hole penetrating the first component and aligned with the second portion of the opening,
   a piston located within the piston hole, being complimentary shaped to sit within the piston hole such that the piston can move along the piston hole axis,
   a first pressure member located within the second portion of the opening, and
   an activator configured to coordinate with and extend into the first portion of the opening, wherein when activated the activator applies a force to the pressure member to distort the pressure member,
   wherein the second component is configured to compliment and mate with the first component, the second component having an engaging surface shaped to coordinate with an end of the piston,
   wherein, in operation, the force applied to the pressure member by the activator causes the pressure member to distort and apply pressure to the piston to extend the piston outward from the first component, thereby causing the piston to interact with the engaging surface of the second component to restrain the second component.

2. The securing apparatus of claim 1, wherein the activator has male threads on its exterior and the first portion of the opening has female threads on its interior which complement the male threads of the activator.

3. The securing apparatus of claim 2, further comprising a torsion isolator located between the activator and the pressure member that in operation prevents torsional forces applied by the activator from transmitting to the pressure member.

4. The securing apparatus of claim 2, further comprising a set screw having an end, the set screw being installed in the second portion of the opening wherein the bottom surface of the opening is established by the end of the set screw.

5. The securing apparatus of claim 1, further comprising a second pressure member located between the first pressure member and the bottom of the opening.

6. The securing apparatus of claim 5, wherein the second pressure member is cylindrical.

7. A connector pin and nut assembly, comprising:
   a pin, the pin having a first end and a second end, the first end of the pin having an opening that elongates into the pin, the opening formed by a first portion which is threaded and located near the first end of the pin and a second portion adjacent said first portion, the pin having at least one piston hole penetrating the pin laterally to align with the second portion of the opening;
   at least one piston aligned within the at least one piston hole, the at least one piston being complimentary shaped to engage the at least one piston hole such that only a portion of the at least one piston can extend outward from the pin;
   a pressure element located at the second portion of the opening;
   an activator having a threaded shank adapted to coordinate with and extend into the opening to thereby apply a force to the pressure element; and
   a nut having a body and an aperture extending through the body, the aperture having a groove encircling said aperture and shaped to engage the at least one piston when the at least one piston extends from the pin,
   wherein, in operation, the force applied to the pressure element by the activator causes the pressure member to distort and apply pressure to the at least one piston to extend the at least one piston outward from the pin and into the groove to restrain the nut to the pin.

8. The connector pin and nut assembly of claim 7, wherein the activator has male threads on its exterior and the first portion of the blind hole has female threads on its interior which are complimentary to the male threads of the activator wherein pressure is applied to the pressure member by tightening the activator into the opening.

9. The connector pin and nut assembly of claim 8, further comprising a torsion isolator located between the activator and the pressure member that in operation prevents torsional forces applied by the activator from transmitting to the pressure member.

10. The connector pin and nut assembly of claim 7, wherein the pin further comprises an o-ring groove in the first end of the pin and an o-ring seated in said o-ring groove.

11. The connector pin and nut assembly of claim 7, wherein the groove in the aperture of the nut only partially encircles said aperture.

12. The connector pin and nut assembly of claim 7, further comprising a nut-stopper located on the pin between the first end of the pin and the piston holes.

13. The connector pin and nut assembly of claim 12, wherein the nut-stopper is an o-ring located in an o-ring groove encircling the pin between the first end of the pin and the piston holes.

14. The connector pin and nut assembly of claim 7, further comprising a pressure element restraint in the opening which prevents the pressure element from removal from the opening unless the pressure element restraint is disengaged or removed.

15. The connector pin and nut assembly of claim 14, wherein the pressure element restraint is at least one secondary pin installed in a hole which penetrates the pin transverse to the opening and between the pressure element and the first end of the pin.

16. The connector pin and nut assembly of claim 7, further comprising a second pressure member located between the first pressure member and the bottom of the opening.

17. The connector pin and nut assembly of claim 16, wherein the second pressure member is cylindrical and has an axis, the axis of the second pressure member being transverse to the axis of the opening and coaxial with the axis of the piston hole.

18. A method for securing a first component to a second component, the steps of the method comprising:
   connecting a first component to a second component wherein the first component comprises:
      an elongated member having an opening extending along and central axis the opening formed by a first portion a second portion adjacent said first portion, and a bottom surface, the elongated member having a piston hole extending along a lateral axis, the piston hole penetrating the first component and aligned with the second portion of the opening;

a piston located within the piston hole, being complimentary shaped to sit within the piston hole such that the piston can move along the piston hole axis;

a first pressure member located within the second portion of the opening; and, an activator configured to coordinate with and extend into the first portion of the opening wherein when activated the activator applies a force to the pressure member to distort the pressure member;

wherein the second component is configured to compliment and mate with the first component, the second component having an engaging surface shaped to coordinate with an end of the piston, and wherein, in operation, the force applied to the pressure member by the activator causes the pressure member to distort and apply pressure to the piston to extend the piston outward from the first component thereby causing the piston to interact with the engaging surface of the second component to restrain the second component.

19. The method for securing a first component to a second component of claim 18, wherein the activator has male threads on its exterior and the first portion of the opening has female threads on its interior which complement the male threads of the activator.

20. The method for securing a first component to a second component of claim 19, wherein the first component further comprises a torsion isolator located between the activator and the pressure member that in operation prevents torsional forces applied by the activator from transmitting to the pressure member.

21. The method for securing a first component to a second component of claim 18, wherein the first component further comprises a second pressure member located between the first pressure member and the bottom of the opening.

22. The method for securing a first component to a second component of claim 21, wherein the second pressure member is cylindrical.

* * * * *